March 15, 1960 E. A. ANDRIOLA 2,928,933
ARC SHIELD FOR PROVIDING A UNIFORM INERT-GAS MANTLE
Filed Dec. 30, 1957
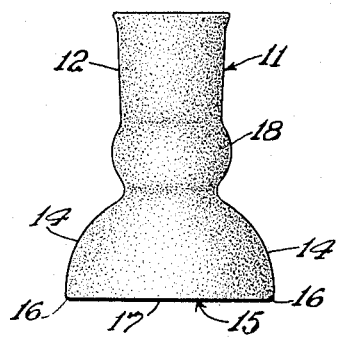
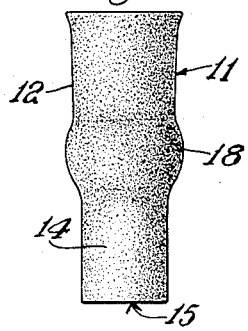
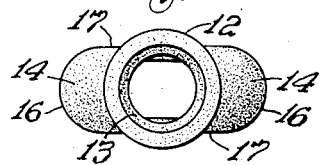
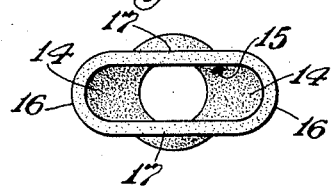
INVENTOR.
*Edward A. Andriola*
BY *Norman N. Popper*
ATTORNEY

United States Patent Office 2,928,933
Patented Mar. 15, 1960

2,928,933

ARC SHIELD FOR PROVIDING A UNIFORM INERT-GAS MANTLE

Edward A. Andriola, Lyndhurst, N.J.

Application December 30, 1957, Serial No. 706,088

2 Claims. (Cl. 219—147)

My invention relates generally to arc shields for welding torches and specifically to an arc shield that provides an inert gas mantle that will blanket the work-piece in spite of the intrusion of a welding rod into the mantle.

It is among the objects of my invention to provide a uniform inert-gas mantle for a fusion welding operation.

It is a further object of my invention to provide an inert-gas mantle for a fusion welding operation which mantle is not readily broken by the intrusion of a welding rod.

It is a further object of my invention to provide an inert-gas mantle which will blanket the work-piece both in front of and behind the point of weld.

It is yet a further object of my invention to provide an arc shield which is transparent so that the precise point of weld is readily observable.

Yet another object of my invention is to provide an inert-gas mantle or blanket that regulates the temperature of the work-piece both before and after the weld.

Among the further objects of my invention is to provide an inert-gas shielding mantle to inhibit oxidation at the point of the weld.

These objects and advantages as well as other objects and advantages may be achieved by the device illustrated in the drawings, in which—

Figure 1 is a front elevational view of an embodiment of my arc shield;

Figure 2 is a side elevational view thereof;

Figure 3 is a top plan view thereof;

Figure 4 is a bottom view thereof.

In fusion welding, the necessity for a secure weld is of vital importance to the durability of the welded product. Oxidation at the point of weld produces an inferior product of questionable durability. Frequently, an inert-gas mantle supplied by the arc shield to the point of weld does not produce a satisfactory inert gaseous mantle and the result is oxidation, too rapid cooling, or non-uniform cooling, with the result that the stability and durability of the welded product is drastically impaired. Frequently, the inert-gaseous mantle is so drastically disturbed by the instrusion of a filler rod which is applied to the work-piece at the point of weld to melt and form a bead at the point of juncture between the parts of the work-piece to be welded, that the gaseous mantle becomes incomplete and provides little protection from the surrounding atmosphere. The result is oxidation of the bead of the weld and an impairment of the stability of the work-piece. This problem is particularly acute when certain metals are welded, such as titanium and similar metals. The impairment of the stability of the weld through oxidation resulting from an incomplete gaseous mantle necessitates the complete discarding of the product. The use of an arc shield which provides a uniform inert-gas mantle which mantle is not disturbed by the intrusion of the filler rod obviates the foregoing difficulties and disadvantages.

Referring now to the drawings in detail, my arc shield for providing a uniform inert-gas mantle which is not readily disturbed by a filler rod and which blankets the work-piece both ahead and behind the point of weld as it is formed, consists of a body member 11, which is preferably formed of a transparent, clear, colorless material, such as Pyrex, quartz, or vycor. These transparent materials are highly resistant to heat, cracking, crazing, and clouding when subjected to intense heat. The body member has an upper portion 12, which is generally circular and is provided with an internal axial bore 13. At the bottom of the body-member 11, there are formed on opposite sides thereof, arcuate flares 14—14. These flares terminate in substantially the same plane and define at the lower portion of the body member 11, an ovalised inert-gas discharge port 15. This discharge port has outer edges 16—16 which are semi-circular in form and these outer edges are united together with generally parallel sides 17-17. The axial bore 13, is dimensioned to frictionally engage the tip of a welding torch. When the torch is operated, the discharge port should be oriented so that the flares 14—14, will be moved in the direction in which the bead of the weld is being laid down. The flares will thereby provide an inert gas mantle in front of the point of weld, which gas mantle will serve as a heat exchange medium with the weld and prevent a too rapid increase in temperature of the workpiece, keeping such increase in temperature on a gradual scale. Likewise the gas mantle will shield the work-piece as well as the bead and prevent substantial oxidation at the point of weld, as well as before and after the point of weld. As the rear flare 14, moves by the point of weld, it will serve to blanket and cool the work-piece and the bead so that, at the time the bead moves beyond the range of the inert-gas mantle, it will have cooled to such a degree as to no longer readily be subject to oxidation. It is at this point, after the bead is formed, that most oxidation usually occurs. With a somewhat ovalized arc shield, such as has been provided by my invention, the intrusion of the filler rod into the area in which the inert-gas mantle is formed has been found to create a minimum of turbulence and a minimum of disturbance of the inert-gas mantle. The gas mantle is allowed substantially to completely mask the hot bead and work-piece and oxidation is minimized.

It has been further found to be advantageous to provide an annular, internal concavity 18 in the bore which integrally connects the upper, axial bore of the body-member with the opposed bottom flares of the body member. This concavity serves as a mixing chamber which establishes a turbulent flow of inert-gas as it enters the flared portion of the body-member 11. With the inert-gas flowing in a turbulent fashion, rather than in a well-defined and regular stream, the intrusion of the filler rod into the turbulent flow of inert-gas is less disturbing and provides a more complete mask of inert-gas over the entire area of the shield and the opposite work-piece. Without such turbulence being imparted to the flowing inert-gas, the filler rod tends to form voids on the gaseous mantle, which voids permit the intrusion of the outside atmosphere to the point of the weld and permit oxidation. With the inert-gas flowing in a turbulent manner rather than in a well-defined, straight stream, the gaseous mantle remains substantially complete and unbroken without the formation of voids.

The foregoing description is merely intended to illustrate an embodiment of the invention. The component parts have been shown and described. They each may have substitutes which may be known as proper substitutes for the said components and may have actually been known or invented before the present invention; these substitutes are contemplated as being within the scope of the appended claims, although they are not specifically catalogued herein.

I claim:
1. An arc shield for providing a uniform inert-gas mantle comprising a heat-resistant, transparent, body-member with a generally circular, upper axial bore, opposed bottom arcuate flares in the body-member defining a generally ovalised inert-gas discharge port with generally parallel sides and connecting semi-circular ends, and the bottom edge of the discharge port lying in the same plane, an annular internal concavity in the bore integrally connecting the upper axial bore of the body-member with the opposed bottom flares of the body-member.

2. An arc shield for providing a uniform inert-gas mantle comprising a heat resistant, transparent, body-member with a generally circular upper axial bore, opposed bottom arcuate flares in the body-member defining a generally ovalized inert-gas discharge port symmetrically disposed on each side of a plane containing the axis of the bore, an annular internal concavity in the bore integrally connection the upper axial bore of the body-member with the opposed bottom flares of the body member.

References Cited in the file of this patent

UNITED STATES PATENTS

| | | |
|---|---|---|
| 2,284,648 | Foreman | June 2, 1942 |
| 2,544,711 | Mikhalapov | Mar. 13, 1951 |
| 2,694,129 | Yenni | Nov. 9, 1954 |
| 2,702,846 | Breymeier | Feb. 22, 1955 |
| 2,832,881 | Andriola | Apr. 29, 1958 |